US006666072B2

(12) United States Patent
Hirano et al.

(10) Patent No.: US 6,666,072 B2
(45) Date of Patent: Dec. 23, 2003

(54) EVAPORATIVE EMISSION CONTROL SYSTEM AND METHOD FOR DETECTING LEAKS THEREIN

(75) Inventors: Noboru Hirano, Kariya (JP); Nobuhiko Koyama, Nagoya (JP)

(73) Assignee: Denso Corporation, Aichi-Pref. (JP)

( * ) Notice: Subject to any disclaimer, the term of this patent is extended or adjusted under 35 U.S.C. 154(b) by 0 days.

(21) Appl. No.: 10/191,516

(22) Filed: Jul. 10, 2002

(65) Prior Publication Data

US 2003/0010095 A1 Jan. 16, 2003

(30) Foreign Application Priority Data

Jul. 12, 2001 (JP) ....................................... 2001-212268

(51) Int. Cl.[7] ................................................. G01M 3/04
(52) U.S. Cl. ........................................................ 73/49.7
(58) Field of Search ................................ 73/40, 40.5 R, 73/49.7, 118.1; 702/51; 123/520

(56) References Cited

U.S. PATENT DOCUMENTS

| | | | | | |
|---|---|---|---|---|---|
| 5,295,472 | A | * | 3/1994 | Otsuka et al. | 123/520 |
| 5,396,873 | A | * | 3/1995 | Yamanaka et al. | 123/520 |
| 5,443,051 | A | * | 8/1995 | Otsuka | 123/520 |
| 5,911,209 | A | * | 6/1999 | Kouda et al. | 123/520 |
| 6,276,344 | B1 | * | 8/2001 | Isobe et al. | 123/520 |
| 6,321,727 | B1 | * | 11/2001 | Reddy et al. | 123/520 |
| 6,382,192 | B2 | * | 5/2002 | Kitajima et al. | 123/520 |
| 6,470,862 | B2 | * | 10/2002 | Isobe et al. | 123/520 |
| 2002/0062861 | A1 | * | 5/2002 | Devall | 137/202 |

FOREIGN PATENT DOCUMENTS

| | | |
|---|---|---|
| EP | 0 952 332 A2 | 10/1999 |
| JP | 11-30157 | 2/1999 |
| JP | 2000-343927 | 12/1999 |
| JP | 2000-345934 | 12/2000 |
| JP | 2001-82261 A | 3/2001 |

OTHER PUBLICATIONS

US patent application of Kano et al; SN 10/114458.

* cited by examiner

*Primary Examiner*—Hezron Williams
*Assistant Examiner*—Charles Garber
(74) *Attorney, Agent, or Firm*—Nixon & Vanderhye PC

(57) ABSTRACT

In an evaporative emission control system, when an engine is running, a negative pressure generated in an air intake pipe of the engine is introduced into a fuel tank through a negative pressure intake line. When the engine halts, a purge valve provided on a purge line connecting the intake pipe and a canister is closed and defines a closed space between the purge valve and the fuel tank. After the negative pressure in the fuel tank is introduced into the closed space and the closed space is maintained under a continuous and uniform negative pressure, the system starts a leak check. Because the negative pressure intake line is provided with a negative pressure maintaining valve, the fuel tank is maintained under the negative pressure when the engine is running.

2 Claims, 2 Drawing Sheets

EVAPORATIVE EMISSION CONTROL SYSTEM AND METHOD FOR DETECTING LEAKS THEREIN

CROSS REFERENCE TO RELATED APPLICATION

This application is based on Japanese Patent Application No. 2001-212268 filed on Jul. 12, 2001, the disclosure of which is incorporated herein by reference.

FIELD OF THE INVENTION

The present invention relates to an evaporative emission control system in which a canister is provided in an evaporative gas purge system connecting an air intake pipe of an engine and a fuel tank.

BACKGROUND OF THE INVENTION

In an evaporative emission control system disclosed in JP-A-2000-345934 and JP-A-11-343927, for example, a negative pressure generated in an air intake pipe during an engine operation is introduced into a fuel tank. An evaporative gas purge system connecting the air intake pipe and the fuel tank is then maintained under the negative pressure. Change of the pressure is sensed by a sensor, thereby determining leaks in the purge system.

In this kind of evaporative emission control system, the leak check is executed when the engine is running. While a vehicle is moving, a fuel level in the fuel tank is unstable due to vibration of the vehicle. It causes changes of the pressure during the leak check. Therefore, it is difficult to accurately determine the leak when the engine is running. Because the purge system is negatively pressurized in a short time, a large amount of fuel vapor is introduced into the engine at a time. It is likely to affect an air-fuel ratio control, thereby worsening the emission.

SUMMARY OF THE INVENTION

The present invention is made in view of the above problem, and it is an object of the present invention to provide an evaporative emission control system capable of determining leaks accurately.

It is another object of the present invention to provide an evaporative emission control system that suppresses emission from becoming worse.

It is further another object of the present invention to provide a method to accurately determine a leak in an evaporative emission control system.

In an evaporative emission control system of the present invention, a canister communicates with a fuel tank through a negative pressure intake line and an air intake pipe of an engine through a purge line. Fuel vapor generated in the fuel tank is temporarily stored in the canister, and sucked into the air intake pipe by negative pressure generated in the air intake pipe. The negative pressure in the air intake pipe is introduced into the fuel tank through the negative pressure intake line. The purge line is provided with a purge valve to open and close the purge line.

After the engine is switched off, the purge valve is closed and defines a closed space between the purge valve and the fuel tank. The negative pressure introduced in the fuel tank is introduced into the closed space. After the closed space is maintained under a uniform negative pressure, a leak check of the closed space is started.

Because the leak check is executed when the engine halts, that is, when a fuel level in the tank is stable, the leak is accurately detected. Further, because the fuel tank is maintained under the negative pressure when the engine is running, the fuel vapor is prevented from leaking outside through the fuel tank, canister and the like.

BRIEF DESCRIPTION OF THE DRAWINGS

Other objects, features and advantages of embodiments will become more apparent from the following detailed description made with reference to the accompanying drawings, in which.

DETAILED DESCRIPTION OF PREFERRED EMBODIMENT

A preferred embodiment of the present invention will be described hereinafter with reference to the drawings.

Figure 1:
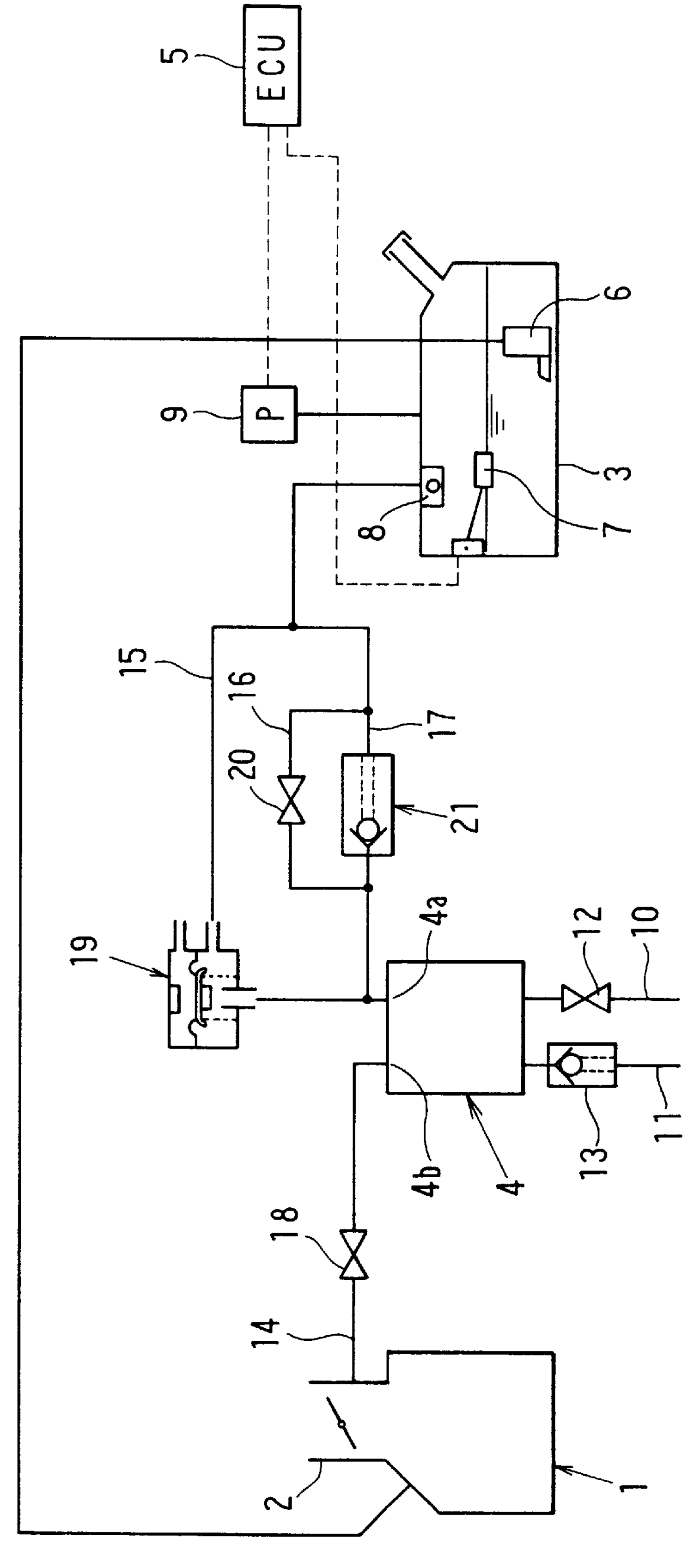
FIG. 1 is a schematic diagram showing an evaporative emission control system according to an embodiment of the present invention.

Referring to FIG. 1, an evaporative emission control system has an air intake pipe 2 of an engine 1, a fuel tank 3 communicating with the intake pipe 2 through an evaporative gas purge system and a canister 4 provided in the purge system. Fuel vapor generated in the fuel tank 3 is temporarily stored in the canister 4 and then drawn into the intake pipe 2 by manifold air pressure (negative pressure) of the engine 1. The system is controlled by an ECU (electronic control unit) 5.

The fuel tank 3 has a fuel pump 6 for drawing and supplying fuel to the engine 1, a fuel gauge unit 7 for gauging a fuel level (remaining amount of the fuel) and a roll over valve 8 for stopping an outflow of the fuel when the fuel tank 3 is inclined due to inclination of a vehicle, and the like. A pressure sensor 9 is provided outside of the fuel tank 3. The pressure sensor 9 senses an inside pressure of the fuel tank 3, and continuously sends outputs to the ECU 5.

The canister 4 has a fuel vapor inlet 4*a* and a fuel vapor outlet 4*b*. The canister 4 stores adsorbent such as activated carbon to adsorb the fuel vapor. The canister 4 has an air intake port 10 and a pressure release port 11. The air intake port 10 is provided with a normally-closed valve (electromagnetic valve) 12 that opens and closes to introduce the air into the canister 4 through the air intake port 10. The pressure release port 11 is provided with a positive pressure relief valve 13 that opens and closes to release pressure in the canister 4 through the pressure release port 11. When the pressure in the canister 4 becomes greater than the atmospheric pressure by a predetermined pressure, the positive pressure relief valve 13 opens.

The purge system includes a purge line 14, a negative pressure intake line 15, a first bypass line 16 and a second bypass line 17. The purge line 14 connects the vapor outlet 4*b* and the intake pipe 2. The negative pressure intake line 15 connects the vapor inlet 4*a* and the fuel tank 3. The first bypass line 16 and the second bypass line 17 are connected to the negative pressure intake line 15, respectively. That is, both the first and second bypass lines 16 and 17 communicate with the canister 4 and the fuel tank 3.

The purge line 14 is provided with a purge valve (electromagnetic valve) 18. The purge valve 18, which is a normally-closed valve, opens and closes the purge line 14.

The negative pressure intake line 15 is provided with a negative pressure maintaining valve 19. The negative pressure introduced into the fuel tank 3 through the negative pressure intake line 15 is maintained equal to or less than a predetermined negative pressure by the negative pressure maintaining valve 19.

The first bypass line 16 bypasses the negative pressure maintaining valve 19. The first bypass line 16 is provided with a normally-open valve (electromagnetic valve) 20. The normally-open valve 20 opens and closes the first bypass line 16. The second bypass line 17 is provided in parallel with the first bypass line 16. The second bypass line 17 is provided with a pressure relief valve 21. When the pressure in the canister 4 becomes greater than the pressure in the fuel tank 3 by a predetermined pressure, the pressure relief valve 21 opens.

Figure 2:
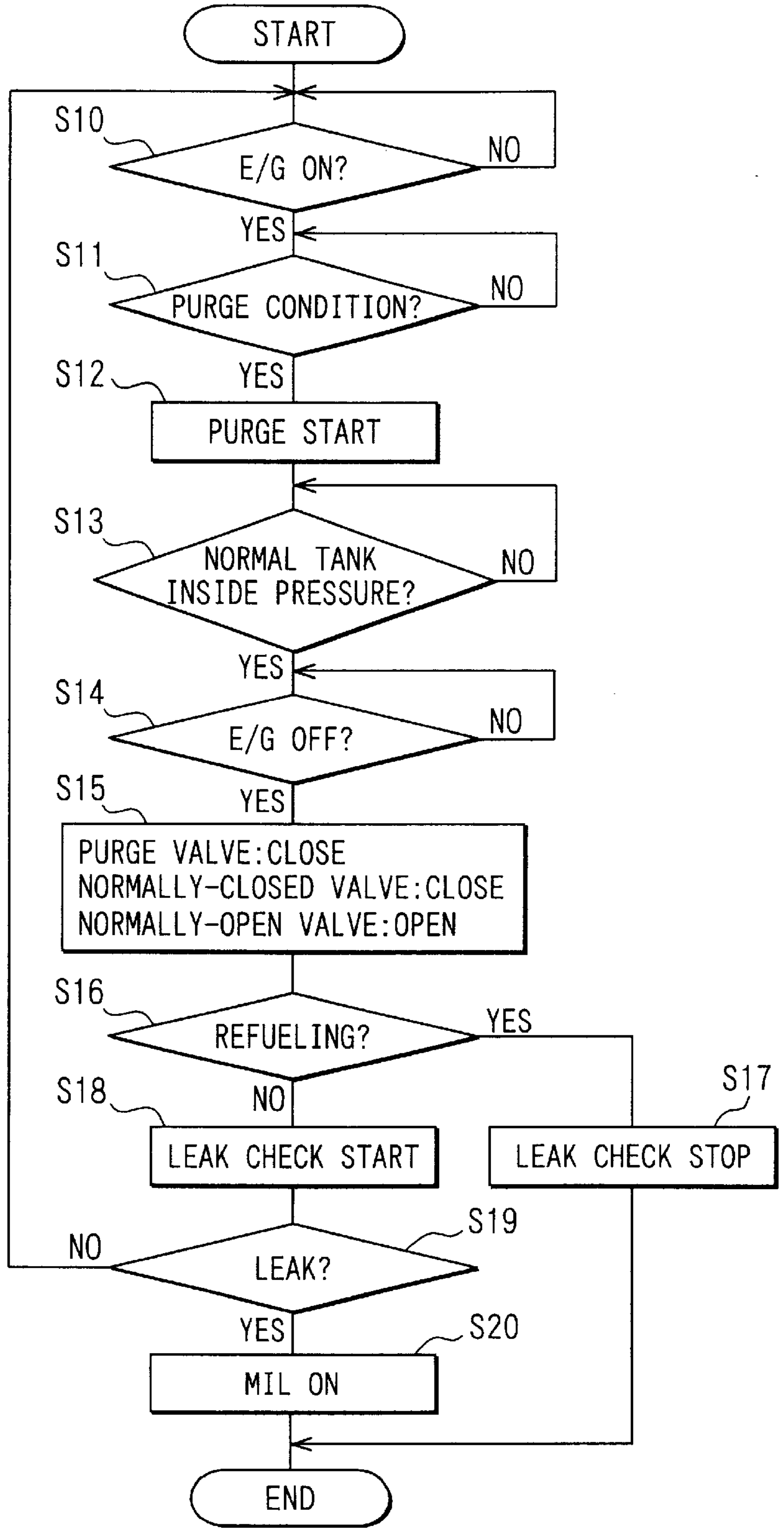
FIG. 2 is a flowchart showing a leak check process executed by an ECU, according to the embodiment of the present invention.

A leak check, which determines whether a leak exists in the evaporative gas purge system or not, is executed by the ECU 5. This ECU 5 is programmed to execute a process of the leak check shown in FIG. 2. The ECU 5 is held operative with electric power supply while the engine 1 is running but also for a predetermined period after the engine 1 is stopped.

First, at step S10, it is determined whether the engine 1 is running (ON) or not. When the engine 1 is running, the process proceeds to step S11. At step S11, it is determined whether purge condition is established or not. When the purge condition is established, the process proceeds to step S12. The purge condition includes the following items.

1. It is not in refueling.

2. It is not in vehicle decelerating. (It is not in fuel-cutting.)

When all items are satisfied, it is determined that the purge condition is established.

At step S12, it starts purging, that is, the negative pressure is introduced into the fuel tank 3. Specifically, the purge valve 18 is opened, and the normally-closed valve 12 and the normally-open valve 20 are closed. Thus, the negative pressure in the engine 1 is introduced into the fuel tank 3 through the negative pressure maintaining valve 19.

Next, at step S13, it is determined whether the inside pressure (negative pressure) of the fuel tank 3 is normal or abnormal. When the pressure sensed by the pressure sensor 9 is within the range of a setting pressure of the negative pressure maintaining valve 19 and a setting pressure of the pressure relief valve 21, the inside pressure is determined normal and the process proceeds to step S14.

At step S14, it is determined whether the engine 1 is switched to a halt (OFF) or not. When the engine 1 halts, the process proceeds to step S15. At step S15, the negative pressure in the fuel tank 3 is introduced into the purge system. Specifically, the purge valve 18 and the normally-closed valve 12 are closed and the normally-open valve 20 is opened. Thus, the purge system from the fuel tank 3 to the purge valve 18 becomes a closed space. The negative pressure in the fuel tank 3 is introduced into the closed space in the purge system and the closed space is maintained under a continuous and uniform negative pressure.

At step S16, it is determined whether it is in refueling or not. When a fuel tank cap is removed for refueling, the inside pressure of the fuel tank 3 suddenly rises. Therefore, whether it is in refueling or not is determined by monitoring the inside pressure of the fuel tank 3 with the pressure sensor 9. When the refueling is detected, the process proceeds to step S17. When the refueling is not detected, the process proceeds to step S18. At step S17, the leak check process is discontinued because it is difficult to maintain the closed space in the purge system under the negative pressure.

At step S18, the leak check is started. Here, a pressure change in the fuel tank 3 or the pressure change per unit time is calculated based on the pressures detected by the pressure sensor 9. At step S19, it is determined whether a leak exists in the purge system or not. When the leak is determined, the process proceeds to step S20. When no leak is determined, the process returns to step S10. At step S20, MIL (Malfunction Indication Lamp) turns on, thereby warning the leak to a driver.

In the system of the present embodiment, since the negative pressure intake line 15 is provided with the negative pressure maintaining valve 19, it is possible to maintain the purge system, which is the closed space defined between the purge valve 18 and the fuel tank 3, under the negative pressure for a predetermined period after the engine 1 is switched off. Therefore, the leak check is executed without using power when the engine 1 halts. Since the leak check is executed when the fuel level in the fuel tank 3 is stable, the leak can be accurately determined.

Further, since the leak check is executed when the engine 1 halts, a fuel ratio control during the engine running is not affected, thereby preventing the emission from becoming worse. Since the fuel tank 3 can be maintained under the negative pressure by the negative pressure maintaining valve 19 when the engine 1 is running, the fuel vapor generated in the fuel tank 3 is restricted from leaking outside through the fuel tank 3, canister 4 and pipes of the purge system.

The first and second bypass lines 16 and 17, which are connected to the negative pressure intake line 15, bypass the negative pressure maintaining valve 19. Further, the first bypass line 16 is provided with the normally-open valve 20 and the second bypass pipe 17 is provided with the pressure relief valve 21. Even when the negative pressure maintaining valve 19 closes during the leak check, the normally-open valve 20 can open and allow the negative pressure in the fuel tank 3 through the first bypass pipe 16. Therefore, the closed space defined between the purge valve 18 and fuel tank 3 can be maintained under the negative pressure and the leak check is executed.

When the engine 1 is running, the fuel tank 3 is maintained under the negative pressure. If the negative pressure increases, the fuel tank 3 is likely to be deformed. However, when the engine 1 is running, that is, when the normal open valve 20 is closed, if the negative pressure in the fuel tank 3 exceeds the predetermined pressure, the pressure relief valve 21 opens. Therefore, the negative pressure in the fuel tank 3 can be released to the canister 4 through the second bypass pipe 17. Accordingly, the deformation of the fuel tank 3 due to the excessive negative pressure can be restricted.

The present invention should not be limited to the disclosed embodiments, but may be implemented in other ways without departing from the spirit of the invention.

What is claimed is:

1. An evaporative emission control system for determining a leak comprising:

an air intake pipe of an engine;

a fuel tank communicating with the intake pipe;

a canister provided between the air intake pipe and the fuel tank for temporarily storing a fuel vapor generated in the fuel tank;

a purge line connecting the canister and the intake pipe and through which the fuel vapor stored in the canister is sucked into the intake pipe by a negative pressure generated in the intake pipe;

a purge valve for opening and closing the purge line; and a negative pressure intake line connecting the fuel tank and the canister so that the negative pressure generated in the intake pipe is introduced into the fuel tank;

wherein, when the engine is stopped, the purge valve is closed and defines a closed space between the purge valve and the fuel tank, the negative pressure in the fuel tank is introduced into the closed space, and the closed space is maintained under a uniform negative pressure to determine a leak in the closed space;

a negative pressure maintaining valve that is provided in the negative pressure intake line to maintain the fuel tank under a predetermined negative pressure;

a first bypass line communicating the fuel tank and the canister and bypassing the negative pressure maintaining valve; and a bypass valve for opening and closing the first bypass line, wherein the bypass valve is closed when the engine is running and is open when the leak is determined.

2. The evaporative emission control system according to claim 1, further comprising:

a second bypass line communicating the fuel tank and the canister and bypassing the negative pressure maintaining valve and the bypass valve; and a pressure relief valve provided in the second bypass line, wherein the pressure relief valve opens the second bypass line when the negative pressure in the fuel tank exceeds a predetermined negative pressure when the engine is running.

* * * * *

UNITED STATES PATENT AND TRADEMARK OFFICE

CERTIFICATE OF CORRECTION

PATENT NO. : 6,666,072 B2
DATED : December 23, 2003
INVENTOR(S) : Hirano, N. et al.

It is certified that error appears in the above-identified patent and that said Letters Patent is hereby corrected as shown below:

Title page,
Item [56], References Cited, FOREIGN PATENT DOCUMENTS, please change the third entry to read as follows: -- JP 11-343927. --

Signed and Sealed this

Thirty-first Day of August, 2004

JON W. DUDAS
*Director of the United States Patent and Trademark Office*